United States Patent
Wen et al.

(10) Patent No.: US 11,847,077 B2
(45) Date of Patent: Dec. 19, 2023

(54) SERIAL PERIPHERAL INTERFACE INTEGRATED CIRCUIT AND OPERATION METHOD THEREOF

(71) Applicant: HIMAX TECHNOLOGIES LIMITED, Tainan (TW)

(72) Inventors: Shan-Chieh Wen, Tainan (TW); Ming-Huai Weng, Tainan (TW); Guei-Lan Lin, Tainan (TW); Che-Hao Chiang, Tainan (TW); Chi-Cheng Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/543,673

(22) Filed: Dec. 6, 2021

(65) Prior Publication Data
US 2023/0176985 A1 Jun. 8, 2023

(51) Int. Cl.
*G06F 13/362* (2006.01)
*G06F 13/42* (2006.01)

(52) U.S. Cl.
CPC ........ *G06F 13/362* (2013.01); *G06F 13/4282* (2013.01); *G06F 2213/0002* (2013.01)

(58) Field of Classification Search
None
See application file for complete search history.

(56) References Cited

U.S. PATENT DOCUMENTS 6,591,310 B1 * 7/2003 Johnson ................ G06F 13/387
710/33
9,529,686 B1 12/2016 Arbel et al.
(Continued)

FOREIGN PATENT DOCUMENTS

| CN | 112600787 | 4/2021 |
| CN | 112612740 | 4/2021 |

(Continued)

OTHER PUBLICATIONS

"Search Report of Europe Counterpart Application", dated Dec. 19, 2022, p. 1-p. 7.
(Continued)

*Primary Examiner* — Henry Tsai
*Assistant Examiner* — Christopher A Bartels
(74) *Attorney, Agent, or Firm* — JCIPRNET

(57) ABSTRACT

A serial peripheral interface (SPI) integrated circuit (IC) and an operation method thereof are provided. A SPI architecture includes a master IC and a slave IC. When the SPI IC is a master IC, the SPI IC generates first command information for a slave IC, generates first debugging information corresponding to the first command information, and sends the first command information and the first debugging information to the slave IC through a SPI channel. When the SPI IC is the slave IC, the SPI IC receives second command information and second debugging information sent by the master IC through the SPI channel and checks the second command information by using the second debugging information. When the SPI IC is a target slave circuit selected by the master IC, the SPI IC executes the second command information under a condition that the second command information is checked and is correct.

22 Claims, 4 Drawing Sheets

(56) References Cited

U.S. PATENT DOCUMENTS

| | | | |
|---|---|---|---|
| 9,632,869 B1 | 4/2017 | Lu et al. | |
| 9,830,297 B2* | 11/2017 | Cappaert | G06F 13/4282 |
| 9,930,051 B1* | 3/2018 | Potlapally | H04L 63/126 |
| 10,255,215 B2* | 4/2019 | Breakstone | G06F 13/16 |
| 10,289,596 B2* | 5/2019 | Chen | G06F 13/1673 |
| 10,503,683 B2* | 12/2019 | Chen | G06F 13/4282 |
| 11,132,323 B2* | 9/2021 | Srivastava | G06F 13/4045 |
| 11,379,398 B2* | 7/2022 | Curtis | G06F 13/4068 |
| 2006/0236204 A1 | 10/2006 | Lee et al. | |
| 2008/0183928 A1 | 7/2008 | Devila et al. | |
| 2013/0082662 A1* | 4/2013 | Carre | H02J 7/00 |
| | | | 320/134 |
| 2016/0253284 A1* | 9/2016 | Cappaert | G06F 13/4282 |
| | | | 710/301 |
| 2019/0102171 A1* | 4/2019 | Tashiro | G06F 9/3016 |
| 2021/0374022 A1 | 12/2021 | Gorbold et al. | |
| 2022/0046114 A1* | 2/2022 | Entelis | H04L 69/08 |

FOREIGN PATENT DOCUMENTS

| | | |
|---|---|---|
| CN | 113220610 | 8/2021 |
| JP | 2016042355 | 3/2016 |
| JP | 2021170714 | 10/2021 |
| WO | 2018225534 | 12/2018 |

OTHER PUBLICATIONS

"Office Action of Taiwan Counterpart Application", dated Jun. 8, 2023, p. 1-p. 9.

"Office Action of Japan Counterpart Application", dated Oct. 5, 2023, p. 1-p. 7.

\* cited by examiner

SERIAL PERIPHERAL INTERFACE INTEGRATED CIRCUIT AND OPERATION METHOD THEREOF

BACKGROUND

Technical Field

The disclosure relates to an integrated circuit, and in particular, relates to a serial peripheral interface integrated circuit and an operation method thereof.

Description of Related Art

In some product applications, a plurality of integrated circuits (ICs) may be required to work together. For instance, in the application of a large touch display IC (LTDI), a plurality of (e.g., 30) driving ICs work together to drive the same large touch display panel. The serial peripheral interface (SPI) architecture may provide a multi-drop driving architecture. In the SPI multi-drop driving architecture, the master IC may connect/drive a plurality of slave ICs through the same wire (channel). When different ICs pass through the SPI channel, the transmission signal of the SPI channel may be distorted due to external influences.

SUMMARY

The disclosure provides a serial peripheral interface (SPI) integrated circuit (IC) and an operation method thereof capable of protecting data transmitted through a SPI channel and/or ensuring accuracy of the data received through the SPI channel.

In an embodiment of the disclosure, the SPI IC includes a core circuit and a debugging circuit. The debugging circuit is coupled to the core circuit. When the SPI IC is a master IC of a SPI architecture, the core circuit generates first command information for a slave IC in the SPI architecture, the debugging circuit generates first debugging information corresponding to the first command information, and the SPI IC sends the first command information and the first debugging information to the slave IC in the SPI architecture through a SPI channel. When the SPI IC is the slave IC in the SPI architecture, the debugging circuit receives second command information and second debugging information sent by the master IC through the SPI channel, and the debugging circuit checks the second command information by using the second debugging information. When the SPI IC is the slave IC of the SPI architecture and the SPI IC is a target slave circuit selected by the master IC of the SPI architecture, the core circuit executes the second command information sent by the master IC under a condition that the second command information is checked by the debugging circuit and is correct.

In an embodiment of the disclosure, the operation method includes the following steps. When a SPI IC is a master IC of a SPI architecture, first command information for a slave IC in the SPI architecture is generated, first debugging information corresponding to the first command information is generated, and the first command information and the first debugging information are sent to the slave IC in the SPI architecture through a SPI channel. When the SPI IC is the slave IC in the SPI architecture, second command information and second debugging information sent by the master IC are received through the SPI channel, and the second command information is checked by using the second debugging information. Further, when the SPI IC is the slave IC of the SPI architecture and the SPI IC is a target slave circuit selected by the master IC of the SPI architecture, the second command information sent by the master IC is executed under a condition that the second command information is checked and is correct.

To sum up, according to practical application scenarios, the SPI IC provided by the embodiments of the disclosure may act as the master IC or the slave IC of the SPI architecture. When the SPI IC is the master IC, the SPI IC may generate the debugging information corresponding to the command information and may send the command information and the debugging information to the slave IC through the SPI channel. When the SPI IC is the slave IC, in the case that the SPI IC is the target slave circuit selected by the master IC of the SPI architecture, the SPI IC may receive the command information and the debugging information sent by the master IC through the SPI channel, and the SPI IC may check the command information by using the debugging information. When the command information is checked and is correct, the SPI IC may execute the command information sent by the master IC. Therefore, the SPI IC may protect the data sent through the SPI channel and/or ensure accuracy of the data received through the SPI channel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
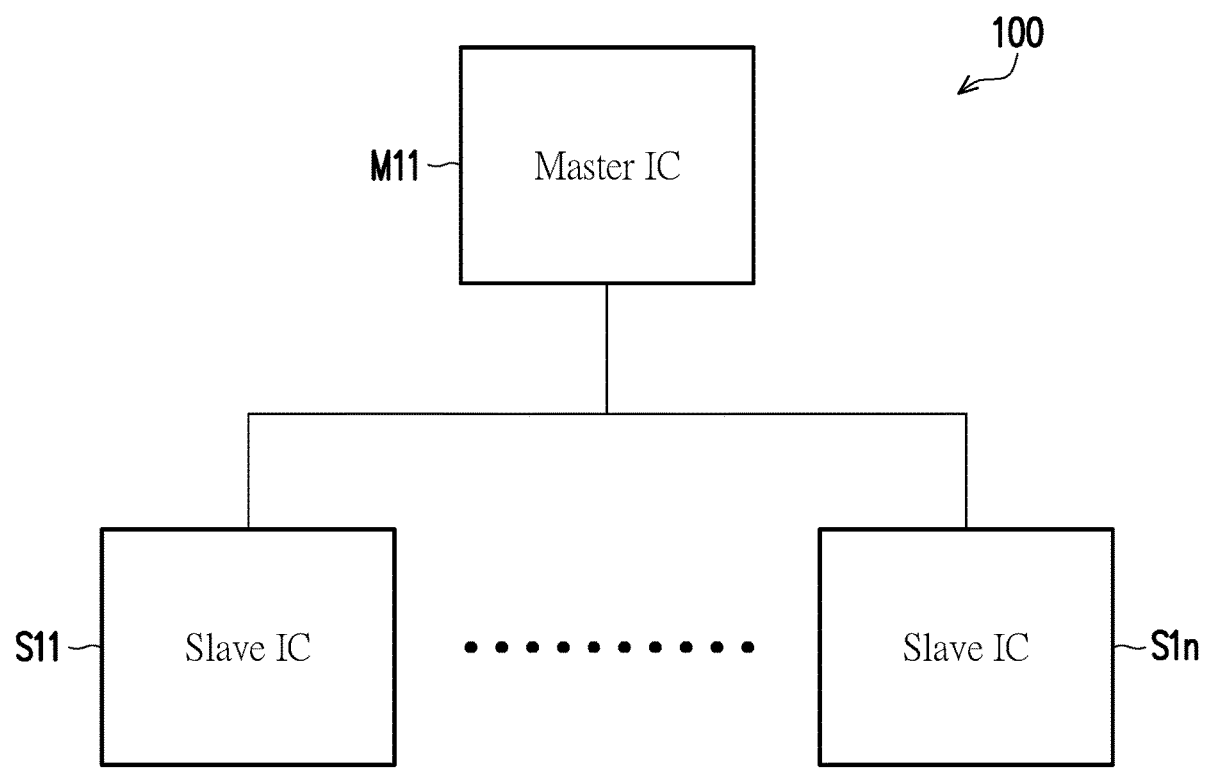
FIG. 1 is a schematic diagram of circuit blocks of a serial peripheral interface (SPI) architecture according to an embodiment of the disclosure.

The term "coupled to (or connected to)" used in the entire disclosure (including claims) refers to any direct or indirect connecting means. For instance, if the disclosure describes a first apparatus is coupled to (or connected to) a second apparatus, the description should be explained as the first apparatus is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of any element and should not be construed to limit the order of the elements. Moreover, elements/components/steps with the same reference numerals represent the same or similar parts in the figures and embodiments where appropriate. Descriptions of the elements/components/steps with the same reference numerals or terms in different embodiments may be references for one another.

FIG. 1 is a schematic diagram of circuit blocks of a serial peripheral interface (SPI) architecture 100 according to an embodiment of the disclosure. In the embodiment shown in FIG. 1, the SPI architecture 100 may be a multi-drop driving architecture. The SPI architecture 100 includes a plurality of integrated circuits (ICs), such as a master IC M11 and slave ICs S11, ..., and S1n, for example. A number n of the slave ICs S11 to S1n may be determined according to practical design. In the SPI architecture 100, the slave ICs S11 to S1n are connected to the master IC M11 together. The master IC M11 and the slave ICs S11 to S1n are given/defined with different exclusive identification codes.

The master IC M11 may send a command (or data) and a clock signal compliant with the SPI specification to the slave ICs S11 to S1n through a SPI channel/interface. The master IC M11 may select any one among the slave ICs S11 to S1n as a target slave circuit through the SPI channel/interface, and the target slave circuit may execute (process) the command (or data) sent by the master IC M11. When any one among the slave ICs S11 to S1n determines that it itself is not the target slave circuit selected by the master IC M11, the unselected slave IC may ignore (do not process) the command (data) of the master IC M11.

Figure 2:
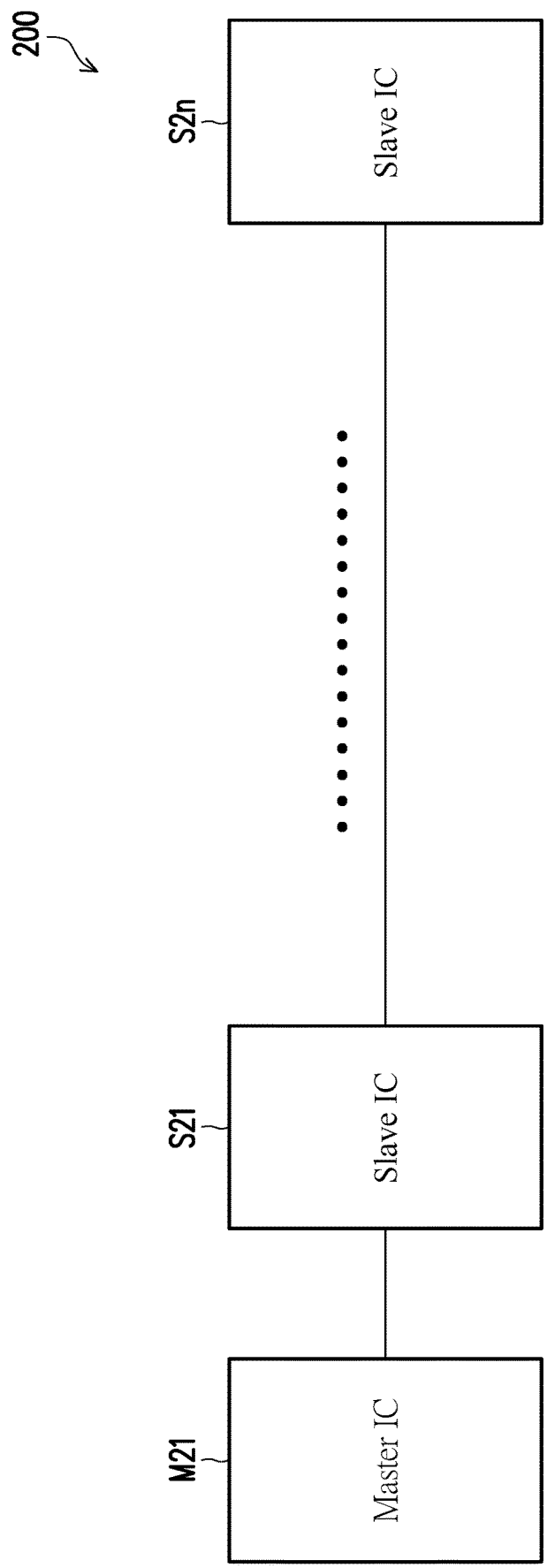
FIG. 2 is a schematic diagram of circuit blocks of a SPI architecture according to another embodiment of the disclosure.

FIG. 2 is a schematic diagram of circuit blocks of a SPI architecture 200 according to another embodiment of the disclosure. In the embodiment shown in FIG. 2, the SPI architecture 200 may be a daisy-chain architecture. The SPI architecture 200 includes a plurality of ICs connected in series, such as a master IC M21 and slave ICs S21, ..., and S2n, for example. A number n of the slave ICs S21 to S1n may be determined according to practical design. In the daisy-chain SPI architecture 200, the slave ICs S21 to S2n are connected in series to form a daisy chain, and the master IC M21 is connected to the first slave IC S21 in the daisy chain. The master IC M21 and the slave ICs S21 to S2n are given/defined with different exclusive identification codes. The master IC M21 may send a command (or data) and a clock signal compliant with the SPI specification to the daisy chain through a SPI channel/interface, and any slave ICs S21 to S2n in the daisy chain may transmit the command (or data) and the clock signal from the previous IC to the subsequent IC.

The master IC M21 may select any one among the slave ICs S21 to S2n as the target slave circuit through the SPI channel/interface. That is, each one of the slave ICs S21 to S2n may decode the command (or data) from the previous IC to determine whether it is the target slave circuit selected by the master IC M21. The target slave circuit may further execute (process) the command (data) sent by the master IC M21. When any one among the slave ICs S21 to S2n determines that it itself is not the target slave circuit selected by the master IC M21, the unselected slave IC may ignore (do not process) the command (data) of the master IC M21.

Figure 3:
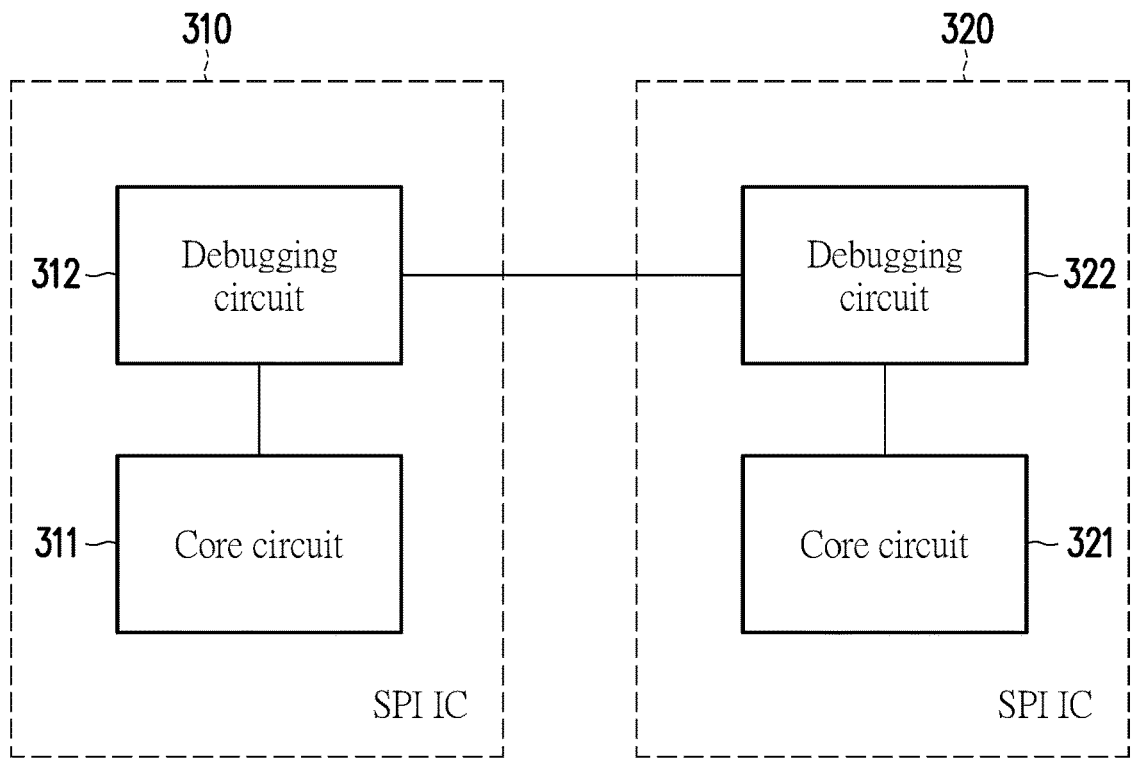
FIG. 3 is a schematic diagram of circuit blocks of SPI integrated circuits according to an embodiment of the disclosure.

FIG. 3 is a schematic diagram of circuit blocks of SPI ICs according to an embodiment of the disclosure. FIG. 3 illustrates a SPI IC 310 and a SPI IC 320. Herein, the SPI IC 310 may act as the master IC (e.g., the master IC M11 shown in FIG. 1 or the master IC M21 shown in FIG. 2) in the SPI architecture, and the SPI IC 320 may act as the slave IC (e.g., one of the slave ICs S11 to S1n shown in FIG. 1 or one of the slave ICs S21 to S2n shown in FIG. 2) in the SPI architecture. The SPI IC 310 may be coupled to the SPI IC 320 through a SPI channel (SPI interface). The SPI IC 310 may send a command (or data) and a clock signal compliant with the SPI specification to the slave SPI IC 320 through the SPI channel. Based on an execution result of the command and/or a processing result of the data, the SPI IC 320 may return the data to the SPI IC 310 through the SPI channel.

Figure 4:
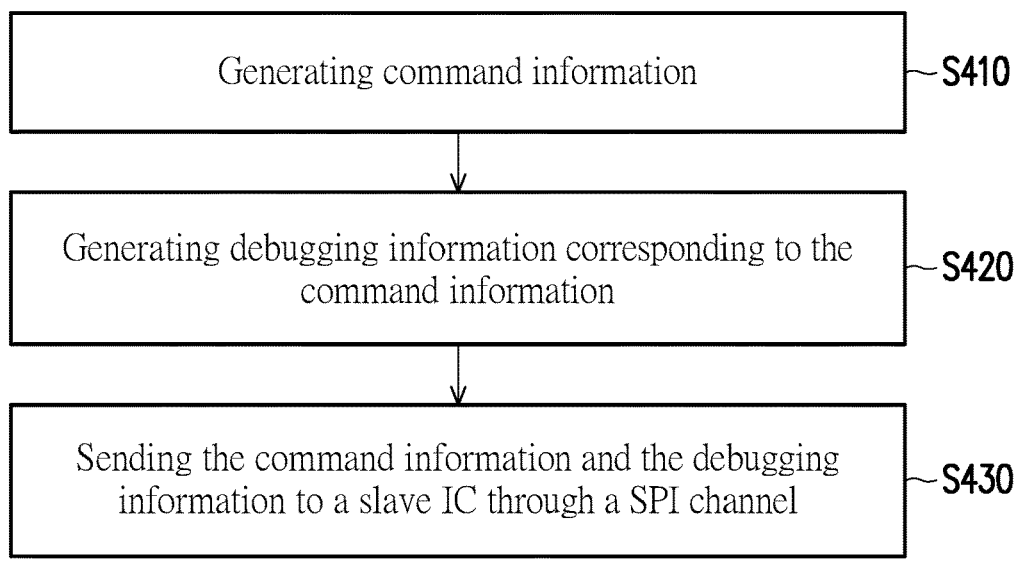
FIG. 4 is a schematic flow chart of an operation method of a SPI integrated circuit according to an embodiment of the disclosure.

FIG. 4 is a schematic flow chart of an operation method of a SPI IC according to an embodiment of the disclosure. With reference to FIG. 3 and FIG. 4, the SPI IC 310 acting as the master IC includes a core circuit 311 and a debugging circuit 312. The debugging circuit 312 is coupled to the core circuit 311. In step S410, the core circuit 311 may generate command information for the SPI IC 320 (slave IC in the SPI architecture, i.e., the target slave circuit), and this command information (first command information) may include a command (data) compliant with the SPI specification. In some practical designs, this command information may include an exclusive identification code (chip identification code) of the target slave circuit. In some other practical designs, this command information may include a chip identification code and a command code compliant with the SPI specification.

In still some other practical designs, this command information may include a data error correcting flag, a chip identification code, and a command code compliant with the SPI specification. The data error correcting flag is used to notify the SPI IC 320 whether to enable an error correcting operation on the data information provided by the SPI IC 310 (detailed description is provided in following paragraphs). For instance, the core circuit 311 may set the data error correcting flag to notify the SPI IC 320 (slave IC) to enable the error correcting operation on the data information. Alternatively, the core circuit 311 may reset the data error correcting flag to notify the SPI IC 320 to disable the error correcting operation on the data information.

In step S420, the debugging circuit 312 may generate debugging information (first debugging information) corresponding to the command information. Specific implementation of generation of the debugging information by the debugging circuit 312 is not limited in this embodiment. For instance, in some practical designs, the debugging information may include an error-correcting code (ECC), that is, the debugging circuit 312 may perform an ECC algorithm on the command information to generate the debugging information. In some other practical designs, the debugging circuit 312 may perform a checksum algorithm or other debugging algorithms on the command information to generate the debugging information.

In step S430, the debugging circuit 312 (or the core circuit 311) may transmit the command information and the debugging information to the SPI IC 320 through the SPI channel. After transmission of the command information and the debugging information is completed, the core circuit 311 may further generate data information (first data information) corresponding to the command information (first command information) and transmit the data information to the SPI IC 320 through the SPI channel. According to practical design, the data information may include an address field, a data field, and/or other fields compliant with the SPI specification.

According to practical design, in some embodiments, the debugging circuit 312 may further generate debugging information (third debugging information) corresponding to the data information. The debugging circuit 312 (or the core circuit 311) may send the data information and the third debugging information to the SPI IC 320 through the SPI channel. Specific implementation of generation of the third debugging information by the debugging circuit 312 is not limited in this embodiment. For instance, in some practical designs, the third debugging information may include a cyclic redundancy check (CRC) code, that is, the debugging circuit 312 may perform a CRC algorithm on the data information to generate the third debugging information. In some other practical designs, the debugging circuit 312 may perform a checksum algorithm or other debugging algorithms on the data information to generate the third debugging information.

Figure 5:
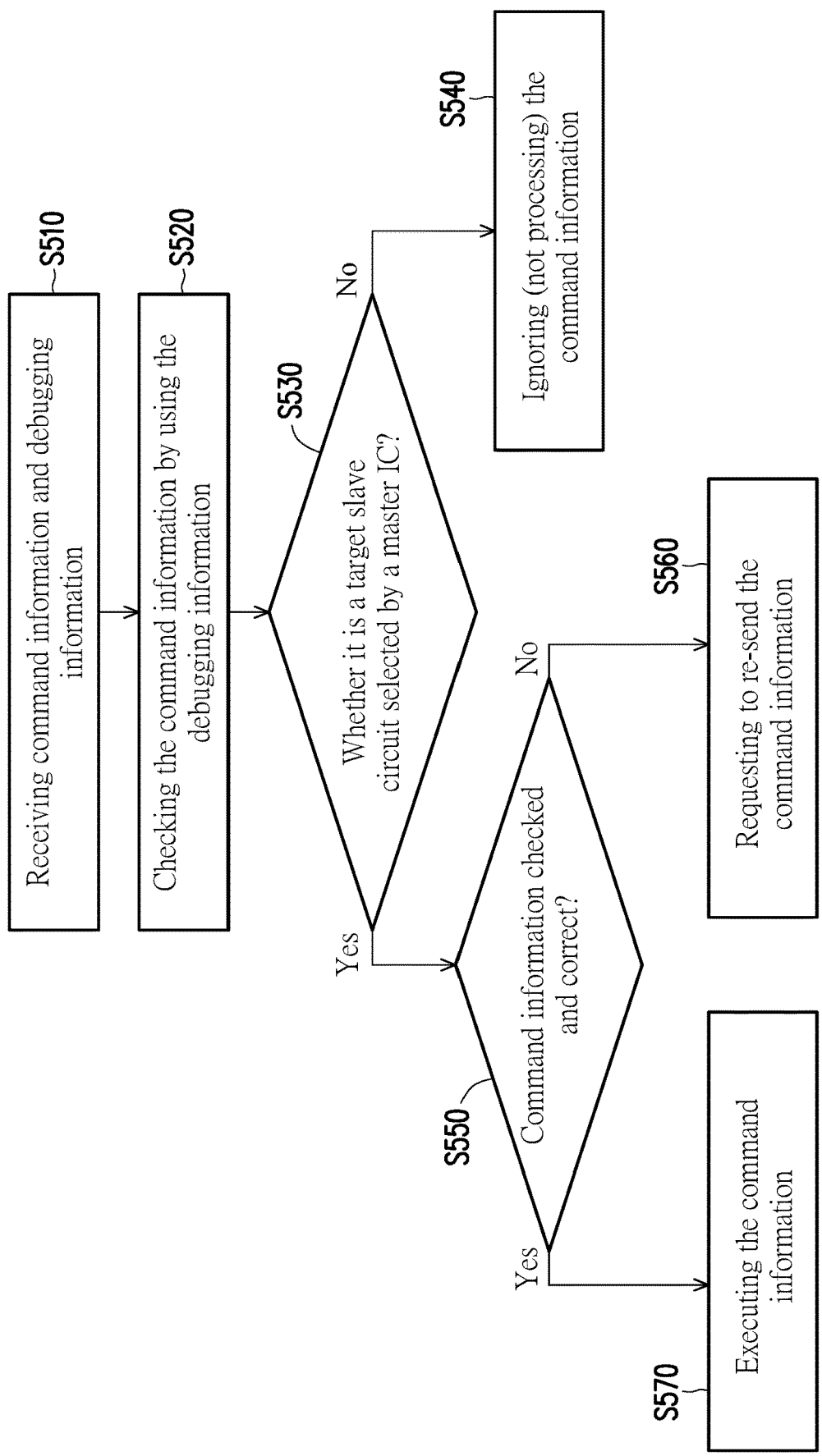
FIG. 5 is a schematic flow chart of an operation method of a SPI integrated circuit according to another embodiment of the disclosure.

FIG. 5 is a schematic flow chart of an operation method of a SPI IC according to another embodiment of the disclosure. With reference to FIG. 3 and FIG. 5, the SPI IC 320 acting as the slave IC in the SPI architecture may include a core circuit 321 and a debugging circuit 322. The debugging circuit 322 is coupled to the core circuit 321. In step S510, the debugging circuit 322 may receive command information (second command information) and debugging information (second debugging information) sent by the SPI IC 310 (master IC) through the SPI channel. In some practical designs, this command information may include a chip identification code (exclusive identification code), a data error correcting flag, a SPI command code, and/or other data. In some practical designs, the debugging information includes an error-correcting code (ECC), a checksum code, or other debugging information. In step S520, the debugging circuit 322 may check the command information by using the debugging information.

The SPI IC 320 (slave IC) may decode the command information from the SPI IC 310 (master IC) to determine whether the SPI IC 320 itself is the target slave circuit selected by the SPI IC 310. When the SPI IC 320 is not the target slave circuit selected by the SPI IC 310 ("No" is determined in step S530), the core circuit 321 may perform step S540. That is, the core circuit 321 may ignore (do not process) the command information from the SPI IC 310. When the SPI IC 320 is the target slave circuit selected by the SPI IC 310 ("Yes" is determined in step S530), the core circuit 321 may perform step S550, so as to determine whether the command information from the SPI IC 310 is checked and is correct.

Based on the checking performed in step S520, when the debugging circuit 32 checks that the command information is wrong ("No" is determined in step S550), the debugging circuit 322 may perform step S560. In step S560, the debugging circuit 322 may return error information (e.g., an error flag) to the SPI IC 310 to notify/request the SPI IC 310 to re-send the command information through the SPI channel. When the SPI IC 320 notifies that the command information is wrong, the core circuit 311 of the SPI IC 310 may re-send the command information to the SPI IC 320 through the SPI channel.

When the debugging circuit 322 checks that the command information is correct ("Yes" is determined in step S550), the core circuit 321 may perform step S570 to execute the command information sent by the SPI IC 310 (master IC). In the process of executing the command information, the debugging circuit 322 may receive the data information (second data information) corresponding to the command information sent by the SPI IC 310 through the SPI channel. According to practical design, the data information may include an address field, a data field, and/or other fields compliant with the SPI specification.

When the data error correcting flag is set, the debugging circuit 322 may further receive debugging information (fourth debugging information) corresponding to the data information through the SPI channel. In some practical designs, the fourth debugging information may include a CRC code, a checksum algorithm, or other debugging information. The debugging circuit 322 may check the command information by using the fourth debugging information. When the debugging circuit 322 checks that the data information is correct, the core circuit 321 may process the data information sent by the SPI IC 310 (master IC). When the debugging circuit 322 checks that one bit (or a plurality of bits) of the data information is wrong, the debugging circuit 322 may repair the data information by using the fourth debugging information.

When the debugging circuit 322 determines that the use of the fourth debugging information is not sufficient to repair the data information that has an error, the debugging circuit 322 may return error information (e.g., an error flag) to the SPI IC 310 (master IC) to notify/request the SPI IC 310 to re-send the data information through the SPI channel. When the SPI IC 320 notifies that the data information is wrong, the core circuit 311 of the SPI IC 310 may re-send the data information to the SPI IC 320 through the SPI channel.

In still some other practical designs, the command information from the SPI IC 310 may include a data error correcting flag. The SPI IC 320 may determine whether to enable the error correcting operation on the data information provided by the SPI IC 310 according to the data error correcting flag from the SPI IC 310. For instance, when the data error correcting flag is enabled, the debugging circuit 322 may check the data information from the SPI IC 310 by using the fourth debugging information. When the data error correcting flag is disabled, the debugging circuit 322 may not check the data information.

In view of the foregoing, in a system having multiple chips connected in series, the master IC may select one chip (slave IC) by using the chip identification code and issue a command to read and write the selected chip. In some embodiments, the master IC and the slave IC may protect the chip identification code and the command by using ECC. If an error occurs in the transmission of the chip identification code and the command, the slave IC may request the master IC to re-send to repair the chip identification code and the command. Therefore, the master IC and the slave IC may ensure accuracy of the chip identification code and the command. After it is ensured that the chip identification code and the command are successfully sent, the master IC may then send an address and data to the slave IC. The master IC and the slave IC may confirm accuracy of the address and data by using CRC. If an error occurs in the transmission of the address and data, the slave IC may repair the address and data in time or return an error signal to the master IC to re-send the address and data.

According to different design needs, the core circuit 311, the debugging circuit 312, the core circuit 321, and/or the debugging circuit 322 may be implemented in the form of hardware, firmware, software (i.e., a program), or a combination of the majority of the foregoing three. In the form of hardware, the core circuit 311, the debugging circuit 312, the core circuit 321, and/or the debugging circuit 322 may be implemented in the form of a logic circuit on an IC. Related functions of the core circuit 311, the debugging circuit 312, the core circuit 321, and/or the debugging circuit 322 may be implemented as hardware through using hardware description languages (e.g., Verilog HDL or VHDL) or other suitable programming languages. For instance, the related function of the core circuit 311, the debugging circuit 312, the core circuit 321, and/or the debugging circuit 322 may be implemented in one or a plurality of controllers, a micro controller, a micro processor, an application-specific integrated circuit (ASIC), a digital signal processor (DSP), a field programmable gate array (FPGA), and/or various logic blocks, module, and circuits in other processing units.

In the form of software and/or firmware, the related functions of the core circuit 311, the debugging circuit 312, the core circuit 321, and/or the debugging circuit 322 may be implemented as programming codes. For instance, the core circuit 311, the debugging circuit 312, the core circuit 321, and/or the debugging circuit 322 may be implemented by using a general programming language (e.g., C, C++, or an assembly language) or other suitable programming languages. The programming codes may be recorded/stored in a "non-transitory computer readable medium". In some embodiments, the non-transitory computer readable medium includes, for example, a ready only memory (ROM), a semiconductor memory, a programmable logic circuit, and/or a storage device. The storage device includes a hard disk drive (HDD) a solid-state drive (SSD), or other storage devices. A central processing unit (CPU), a controller, a micro controller, or a micro processor may read and execute the programming code from the non-transitory computer readable medium to accomplish the related functions of the core circuit 311, the debugging circuit 312, the core circuit 321, and/or the debugging circuit 322.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A serial peripheral interface (SPI) integrated circuit (IC), comprising:
    a core circuit; and
    a debugging circuit, coupled to the core circuit, wherein
    when the SPI IC is a master IC of a SPI architecture, the core circuit generates first command information for a slave IC in the SPI architecture, the debugging circuit generates first debugging information corresponding to the first command information, and the first command information and the first debugging information are sent to the slave IC in the SPI architecture through a SPI channel, wherein the first command information comprises a first data error correcting flag;
    when the SPI IC is the slave IC of the SPI architecture, the debugging circuit receives second command information and second debugging information sent by the master IC through the SPI channel, and the debugging circuit checks the second command information by using the second debugging information, wherein the second command information comprises a second data error correcting flag;
    when the SPI IC is the slave IC of the SPI architecture and the SPI IC is a target slave circuit selected by the master IC of the SPI architecture, the core circuit executes the second command information sent by the master IC under a condition that the second command information is checked by the debugging circuit and is correct;
    when the SPI IC is the master IC of the SPI architecture, the core circuit generates first data information corresponding to the first command information, the debugging circuit generates third debugging information corresponding to the first data information, and the first data information and the third debugging information are sent to the slave IC in the SPI architecture through the SPI channel;
    when the SPI IC is the slave IC of the SPI architecture and the SPI IC is the target slave circuit selected by the master IC of the SPI architecture, the debugging circuit receives second data information corresponding to the second command information sent by the master IC and fourth debugging information corresponding to the second data information, the debugging circuit checks the second data information by using the fourth debugging information, and the core circuit processes the second data information sent by the master IC under a condition that the second data information is checked by the debugging circuit and is correct;
    when the SPI IC is the master IC of the SPI architecture, the core circuit resets the first data error correcting flag to notify the slave IC in the SPI architecture to disable the error correcting operation on the first data information;
    when the SPI IC is the slave IC of the SPI architecture, the SPI IC is the target slave circuit selected by the master IC of the SPI architecture, and the second data error correcting flag is enabled, the debugging circuit checks the second data information by using the fourth debugging information; and
    when the SPI IC is the slave IC of the SPI architecture, the SPI IC is the target slave circuit selected by the master IC of the SPI architecture, and the second data error correcting flag is disabled, the debugging circuit does not check the second data information.

2. The SPI IC according to claim 1, wherein when the SPI IC is the master IC of the SPI architecture and the slave IC in the SPI architecture notifies that the first command information is wrong, the core circuit re-sends the first command information to the slave IC through the SPI channel.

3. The SPI IC according to claim 1, wherein when the SPI IC is the slave IC of the SPI architecture and the second command information is checked by the debugging circuit and is wrong, the debugging circuit notifies the master IC of the SPI architecture to re-send the second command information through the SPI channel.

4. The SPI IC according to claim 1, wherein the first debugging information comprises a first error-correcting code, and the second debugging information comprises a second error-correcting code.

5. The SPI IC according to claim 1, wherein the first command information comprises a first chip identification code and a first command code, and the second command information comprises a second chip identification code and a second command code.

6. The SPI IC according to claim 5, wherein the first command information further comprises a first data error correcting flag, and the second command information further comprises a second data error correcting flag.

7. The SPI IC according to claim 1, wherein when the SPI IC is the master IC of the SPI architecture and the slave IC in the SPI architecture notifies that the first data information is wrong, the core circuit re-sends the first data information to the slave IC through the SPI channel.

8. The SPI IC according to claim 1, wherein when the SPI IC is the slave IC of the SPI architecture and the debugging circuit checks that one bit of the second data information is wrong, the debugging circuit repairs the second data information by using the fourth debugging information.

9. The SPI IC according to claim 8, wherein when the SPI IC is the slave IC of the SPI architecture and the debugging circuit determines that the use of the fourth debugging information is not sufficient to repair the second data information that has an error, the debugging circuit notifies the master IC of the SPI architecture to re-send the second data information through the SPI channel.

10. The SPI IC according to claim 1, wherein the third debugging information comprises a first cyclic redundancy check code, and the fourth debugging information comprises a second cyclic redundancy check code.

11. The SPI IC according to claim 1, wherein the first data information comprises a first address field and a first data field, and the second data information comprises a second address field and a second data field.

12. An operation method of a serial peripheral interface (SPI) integrated circuit (IC), comprising:
when the SPI IC is a master IC of a SPI architecture, generating first command information for a slave IC in the SPI architecture, generating first debugging information corresponding to the first command information, and sending the first command information and the first debugging information to the slave IC in the SPI architecture through a SPI channel, wherein the first command information comprises a first data error correcting flag;
when the SPI IC is the slave IC of the SPI architecture, receiving second command information and second debugging information sent by the master IC through the SPI channel and checking the second command information by using the second debugging information, wherein the second command information comprises a second data error correcting flag;
when the SPI IC is the slave IC of the SPI architecture and the SPI IC is a target slave circuit selected by the master IC of the SPI architecture, executing the second command information sent by the master IC under a condition that the second command information is checked and is correct;
when the SPI IC is the master IC of the SPI architecture, generating first data information corresponding to the first command information, generating third debugging information corresponding to the first data information, and sending the first data information and the third debugging information to the slave IC in the SPI architecture through the SPI channel;
when the SPI IC is the slave IC of the SPI architecture and the SPI IC is the target slave circuit selected by the master IC of the SPI architecture, receiving second data information corresponding to the second command information sent by the master IC and fourth debugging information corresponding to the second data information, checking the second data information by using the fourth debugging information, and processing the second data information sent by the master IC under a condition that the second data information is checked and is correct;
when the SPI IC is the master IC of the SPI architecture, resetting the first data error correcting flag to notify the slave IC in the SPI architecture to disable the error correcting operation on the first data information;
when the SPI IC is the slave IC of the SPI architecture, the SPI IC is the target slave circuit selected by the master IC of the SPI architecture, and the second data error correcting flag is enabled, checking the second data information by using the fourth debugging information; and
when the SPI IC is the slave IC of the SPI architecture, the SPI IC is the target slave circuit selected by the master IC of the SPI architecture, and the second data error correcting flag is disabled, not checking the second data information.

13. The operation method according to claim 12, further comprising:
when the SPI IC is the master IC of the SPI architecture and the slave IC in the SPI architecture notifies that the first command information is wrong, re-sending the first command information to the slave IC through the SPI channel.

14. The operation method according to claim 12, further comprising:
when the SPI IC is the slave IC of the SPI architecture and the second command information is checked and is wrong, notifying the master IC of the SPI architecture to re-send the second command information through the SPI channel.

15. The operation method according to claim 12, wherein the first debugging information comprises a first error-correcting code, and the second debugging information comprises a second error-correcting code.

16. The operation method according to claim 12, wherein the first command information comprises a first chip identification code and a first command code, and the second command information comprises a second chip identification code and a second command code.

17. The operation method according to claim 16, wherein the first command information further comprises a first data error correcting flag, and the second command information further comprises a second data error correcting flag.

18. The operation method according to claim 12, further comprising:
when the SPI IC is the master IC of the SPI architecture and the slave IC in the SPI architecture notifies that the first data information is wrong, re-sending the first data information to the slave IC through the SPI channel.

19. The operation method according to claim 12, further comprising:
when the SPI IC is the slave IC of the SPI architecture and one bit of the second data information is wrong, repairing the second data information by using the fourth debugging information.

20. The operation method according to claim 19, further comprising:
when the SPI IC is the slave IC of the SPI architecture and the fourth debugging information is not sufficient to repair the second data information that has an error, notifying the master IC of the SPI architecture to re-send the second data information through the SPI channel.

21. The operation method according to claim 12, wherein the third debugging information comprises a first cyclic redundancy check code, and the fourth debugging information comprises a second cyclic redundancy check code.

22. The operation method according to claim 12, wherein the first data information comprises a first address field and a first data field, and the second data information comprises a second address field and a second data field.

* * * * *